(12) United States Patent
Kaita et al.

(10) Patent No.: US 6,931,318 B2
(45) Date of Patent: Aug. 16, 2005

(54) HYBRID VEHICLE AND METHOD OF STARTING INTERNAL COMBUSTION ENGINE MOUNTED ON HYBRID VEHICLE

(75) Inventors: Keiji Kaita, Aichi-ken (JP); Akihiro Kimura, Toyota (JP); Shinichi Abe, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/786,130

(22) Filed: Feb. 26, 2004

(65) Prior Publication Data

US 2004/0231627 A1 Nov. 25, 2004

(30) Foreign Application Priority Data

May 21, 2003 (JP) ........................................ 2003-143988

(51) Int. Cl.[7] ............................ B60L 11/14; F02N 11/08
(52) U.S. Cl. ..................... 701/113; 123/179.3; 180/65.2
(58) Field of Search ................................. 701/113, 102; 123/179.3; 180/65.2, 65.3

(56) References Cited

FOREIGN PATENT DOCUMENTS

| JP | 11-220809 | * | 8/1999 | ........... B60L/11/14 |
| JP | 2001-263213 | | 9/2001 | |
| JP | 2001-304007 | | 10/2001 | |
| JP | 2002-364401 | * | 12/2002 | ........... F02D/29/02 |

* cited by examiner

Primary Examiner—Hieu T. Vo
(74) Attorney, Agent, or Firm—Kenyon & Kenyon

(57) ABSTRACT

The technique of the invention sets a control start revolution speed Nstart to decrease with an increase in driver's power demand P* and with an increase in vehicle speed V (step S130), and motors an engine (steps S150 to S190). When a revolution speed Ne of the engine reaches the setting of the control start revolution speed Nstart, operation control of the engine starts (step S220). Such settings are ascribed to the following reasons. Setting a relatively small value to the control start revolution speed Nstart is preferable to trigger an early start of operation control of the engine and ensure quick output of power from the engine. In order to ensure reduction of vibrations of initial explosion and resulting reduction of potential vibrations arising at the time of starting the engine, on the other hand, setting a relatively large value to the control start revolution speed Nstart is preferable. The driver's sensitivity to the vibrations is lowered with an increase in vehicle speed V.

17 Claims, 11 Drawing Sheets

HYBRID VEHICLE AND METHOD OF STARTING INTERNAL COMBUSTION ENGINE MOUNTED ON HYBRID VEHICLE

BACKGROUND OF THE INVENTION

1. Field of the Invention

The present invention relates to a hybrid vehicle and a method of starting an internal combustion engine mounted on the hybrid vehicle. More specifically the invention pertains to a hybrid vehicle that is drivable with power from an internal combustion engine and with power from a motor, as well as to a method of starting the internal combustion engine mounted on such a hybrid vehicle.

2. Description of the Prior Art

Various techniques have been proposed to start an internal combustion engine during a run of a hybrid vehicle in a drive mode with only power from a motor. One proposed technique accelerates an ignition timing to start the internal combustion engine in response to a driver's acceleration demand, while retarding the ignition timing to start the internal combustion engine without the driver's acceleration demand (see Patent Laid-Open Gazette No. 2001-263213). The hybrid vehicle of this proposed technique starts the internal combustion engine at the accelerated ignition timing, when the driver demands acceleration. This aims at a quick output of power from the internal combustion engine. The hybrid vehicle starts the internal combustion engine at the retarded ignition timing, on the other hand, when the driver does not demand acceleration. This aims at reduction of the potential vibrations arising at the time of starting the internal combustion engine.

The hybrid vehicle is drivable either in a drive mode with only power from the motor or in a drive mode with power from the internal combustion engine. The important issues arising in the process of starting the internal combustion engine during a run of the hybrid vehicle with only the power from the motor are to ensure a quick response to the driver's acceleration demand and to reduce potential vibrations arising at the time of starting the internal combustion engine. In such a hybrid vehicle, the similar issues occur in the process of stopping the operations of the internal combustion engine.

SUMMARY OF THE INVENTION

A hybrid vehicle of the invention and a corresponding method of starting an internal combustion engine mounted on the hybrid vehicle aim to ensure a quick response to a driver's power demand and to reduce potential vibrations arising at the time of starting the internal combustion engine.

At least part of the above and the other related objects is attained by a hybrid vehicle, a method of starting an internal combustion engine mounted on the hybrid vehicle, and a method of stopping the operations of the internal combustion engine, as discussed below.

A hybrid vehicle of the invention is drivable with power from an internal combustion engine and with power from a motor, and the hybrid vehicle includes: a motoring module that motors the internal combustion engine; a driving condition detection module that detects a driving condition of the hybrid vehicle; a power demand specification module that specifies a driver's power demand; and a start-time control module that, in response to input of a start command of the internal combustion engine during a run in a drive mode where operation of the internal combustion engine is at a stop and the hybrid vehicle is driven with only the power from the motor, drives and controls the motoring module to rotate the internal combustion engine at a control start revolution speed, which has been set based on the driving condition of the hybrid vehicle detected by the driving condition detection module and the power demand specified by the power demand specification module, while starting operation control of the internal combustion engine, which includes fuel injection control and ignition control in the internal combustion engine, when a revolution speed of the internal combustion engine reaches the setting of the control start revolution speed.

In response to input of a start command of the internal combustion engine during a run of the hybrid vehicle in a drive mode where operation of the internal combustion engine is at a stop and the hybrid vehicle is driven with only the power from the motor, the hybrid vehicle of the invention drives and controls the motoring module to rotate the internal combustion engine at the setting of the control start revolution speed, which depends upon the driving condition of the hybrid vehicle and the driver's power demand. The hybrid vehicle starts operation control of the internal combustion engine, which includes fuel injection control and ignition control in the internal combustion engine, when the revolution speed of the internal combustion engine reaches the setting of the control start revolution speed. This arrangement ensures an adequate start of the internal combustion engine at the setting of the control start revolution speed, which depends upon the driving condition of the vehicle and the driver's power demand. The control start revolution speed is used as the criterion of starting operation control of the internal combustion engine. Setting a relatively small value to the control start revolution speed is preferable to trigger an early start of operation control of the internal combustion engine and ensure quick output of power from the internal combustion engine. The smaller setting of the control start revolution speed tends to enhance the potential vibrations arising at the time of starting the internal combustion engine. Setting a relatively large value to the control start revolution speed is thus preferable to reduce the potential vibrations. The arrangement of the invention starts operation control of the internal combustion engine at the control start revolution speed, which depends upon the driving condition of the vehicle and the driver's power demand. This desirably ensures a quick response to the driver's power demand, while effectively reducing the potential vibrations arising at the time of starting the internal combustion engine.

In the hybrid vehicle of the invention, the driving condition detection module may detect a vehicle speed as one driving condition of the hybrid vehicle. In this case, the start-time control module may set the control start revolution speed to decrease with an increase in vehicle speed detected by the driving condition detection module. In the hybrid vehicle of the invention, the start-time control module may set the control start revolution speed to decrease with an increase in power demand specified by the power demand specification module. Such settings are ascribed to the following reasons. The driver's sensitivity to the vibrations is lowered with an increase in vehicle speed. The driver's sensitivity to the vibrations is also lowered with an increase in driver's power demand. When the driver requires a large power demand, it is necessary to quickly start the internal combustion engine and make the power output from the internal combustion engine.

The hybrid vehicle of the invention may further include an electric power-dynamic power input-output module that is connected with an output shaft of the internal combustion engine and with a drive shaft linked with an axle, and output at least part of the power from the internal combustion engine to the drive shaft accompanied with input and output of electric power and dynamic power, and the motoring module may motor the internal combustion engine by utilizing actuation of the electric power-dynamic power input-output module. In this case, the electric power-dynamic power input-output module may include: a three-shaft power input-output assembly that is connected with three shafts, that is, the output shaft of the internal combustion engine, the drive shaft, and a third shaft, and specifies input and output of power from and to one residual shaft among the three shafts, based on powers input and output from and to two shafts among the three shafts; and a generator that inputs and outputs power from and to the third shaft. Further, electric power-dynamic power input-output module may be a pair-rotor motor, which includes a first rotor linked with the output shaft of the internal combustion engine and a second rotor linked with the drive shaft and outputs at least part of the power from the internal combustion engine to the drive shaft accompanied with input and output of electric power generated through an electromagnetic interaction between the first rotor and the second rotor.

The technique of the invention is not restricted to the hybrid vehicle discussed above, but is also actualized by a method of starting an internal combustion engine mounted on such a hybrid vehicle. That is, the technique of the invention is an internal combustion engine starting method that starts an internal combustion engine during a run of a hybrid vehicle in a specific drive mode where operation of the internal combustion engine is at a stop and the hybrid vehicle is driven with only power from a motor, the hybrid vehicle being drivable either in a drive mode with power from the internal combustion engine or in the specific drive mode with only the power from the motor and including a motoring module that motors the internal combustion engine, and the internal combustion engine starting method include the steps of: (a) detecting a driving condition of the hybrid vehicle; (b) specifying a driver's power demand; (c) setting a control start revolution speed, based on the driving condition of the hybrid vehicle detected in the step (a) and the power demand specified in the step (b); (d) driving and controlling the motoring module to rotate the internal combustion engine at the setting of the control start revolution speed; and (e) starting operation control of the internal combustion engine, which includes fuel injection control and ignition control in the internal combustion engine, when a revolution speed of the internal combustion engine reaches the setting of the control start revolution speed.

DESCRIPTION OF THE PREFERRED EMBODIMENTS

Figure 1:
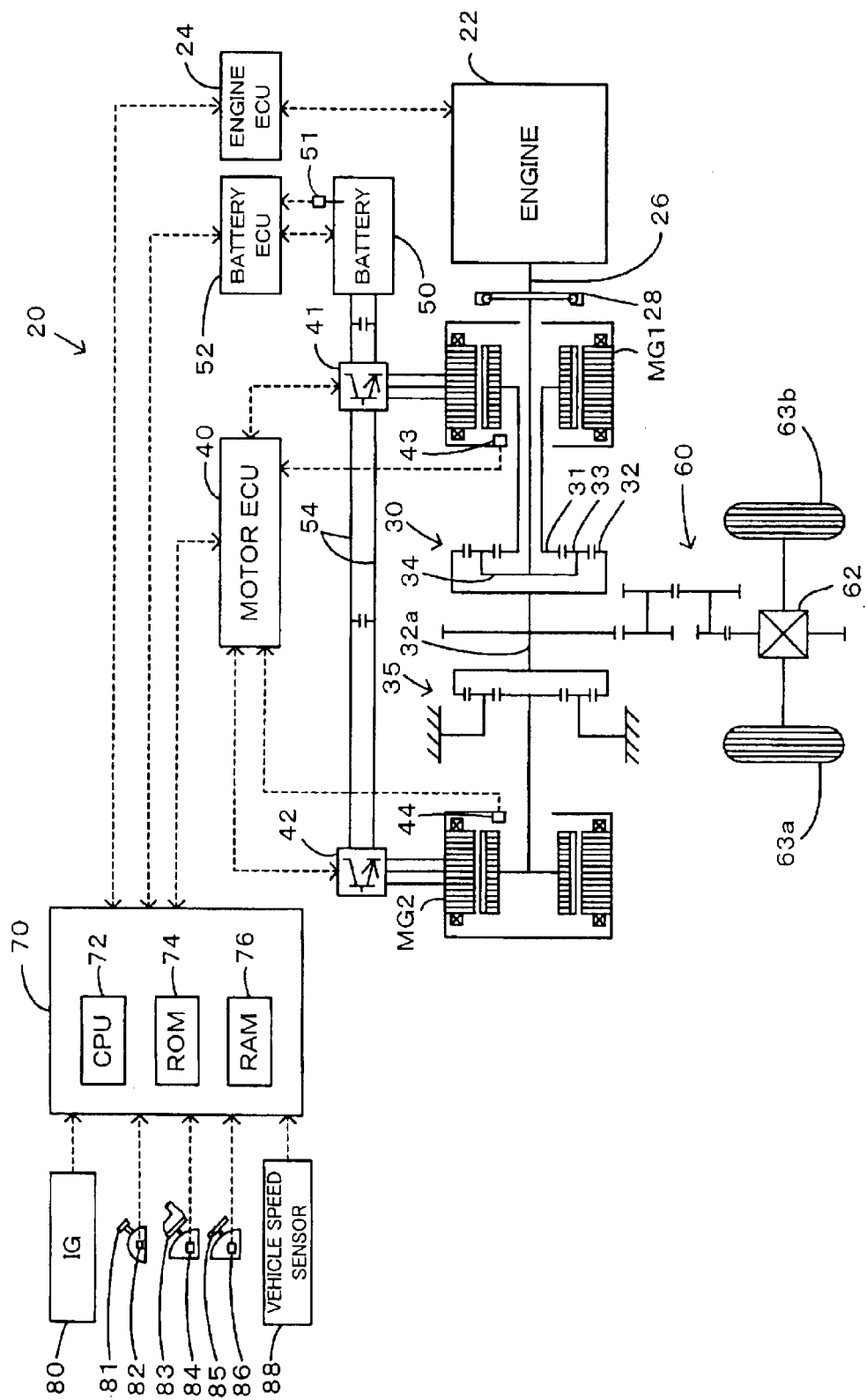
FIG. 1 schematically illustrates the construction of a hybrid vehicle with a power output apparatus mounted thereon in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that consumes a hydrocarbon fuel, such as gasoline or light oil, to output power and is under control of an engine electronic control unit (hereafter referred to as engine ECU) 24. The engine ECU 24 receives input signals from various sensors detecting the driving conditions of the engine 22 and carries out operation control including fuel injection control, ignition control, and intake air flow regulation. The engine ECU 24 communicates with the hybrid electronic control unit 70 and receives control signals from the hybrid electronic control unit 70 to control the operations of the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via the ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is finally transmitted to the driving wheels 63a, 63b via the gear mechanism 60 and differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown) The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and an input-output port and a communication port (not shown). The hybrid electronic control unit 70 receives input of various data and signals via the input port. The input includes, for example, an ignition signal from an ignition switch 80, a gearshift position SP transmitted from a gearshift position sensor 82 that detects the operating position of a gearshift lever 81, an accelerator opening Acc transmitted from an accelerator pedal position sensor 84 that measures the step-on amount of an accelerator pedal 83, a brake pedal position BP transmitted from a brake pedal position sensor 86 that measures the step-on amount of a brake pedal 85, and a vehicle speed V measured by a vehicle speed sensor 88. As mentioned previously, the hybrid electronic control unit 70 connects with the engine ECU 24, the motor ECU 40, and the battery ECU 52 via the communication port and transmits various control signals and data to and from the engine ECU 24, the motor ECU 40, and the battery ECU 52.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging a battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

The following describes the operations of the hybrid vehicle 20 of the embodiment constructed as discussed above, especially an engine start-time operation and an engine stop-time operation. The engine start-time operation is carried out to start the engine 22 and shift the drive mode from the motor drive mode to the torque conversion drive mode or the charge-discharge drive mode, when the driver steps on the accelerator pedal 83 during a run in the motor drive mode, where the engine 22 is at a stop and the hybrid vehicle 20 is driven with the output power from the motor MG2, which is equivalent to the required level of power. The engine stop-time operation is carried out to stop the engine 22 and shift the drive mode from the torque conversion drive mode or the charge-discharge drive mode to the motor drive mode, when the driver steps on a brake pedal 85 during a run in the torque conversion drive mode or the charge-discharge drive mode. The description first regards the engine start-time operation and then the engine stop-time operation.

Figure 2:
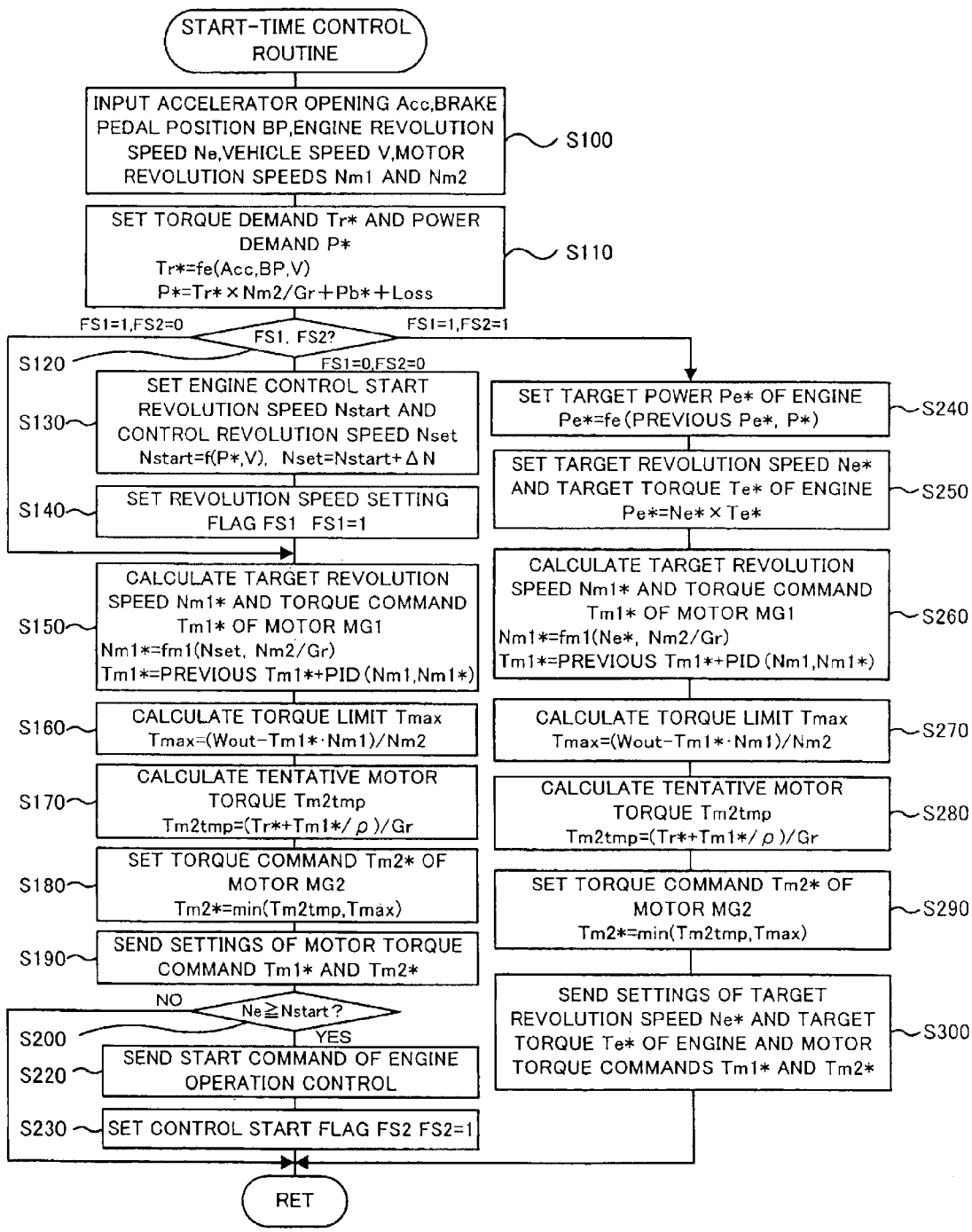
FIG. 2 is a flowchart showing a start-time control routine executed by a hybrid electronic control unit included in the hybrid vehicle of the embodiment.

FIG. 2 is a flowchart showing a start-time control routine, which is executed by the hybrid electronic control unit 70, in response to the driver's step-on action of the accelerator pedal 83 during a run in the motor drive mode to give a start command of the engine 22. This routine is repeatedly executed at preset time intervals (for example, at every 8 msec) since the input of the start command of the engine 22. When the program enters the start-time control routine, the CPU 72 of the hybrid electronic control unit 70 first inputs required data for control, which include an accelerator opening Acc sent from an accelerator pedal position sensor 84, a brake pedal position BP sent from a brake pedal position sensor 86, a vehicle speed V sent from a vehicle speed sensor 88, a revolution speed Ne of the engine 22, and revolution speeds Nm1 and Nm2 of the motors MG1 and MG2 (step S100). The revolution speeds Nm1 and Nm2 of the motors MG1 and MG2 are computed from rotational positions of rotors in the motors MG1 and MG2 detected by rotational position detection sensors 43 and 44 and are input from the motor ECU 40 into the hybrid electronic control unit 70 via communication.

Figure 3:
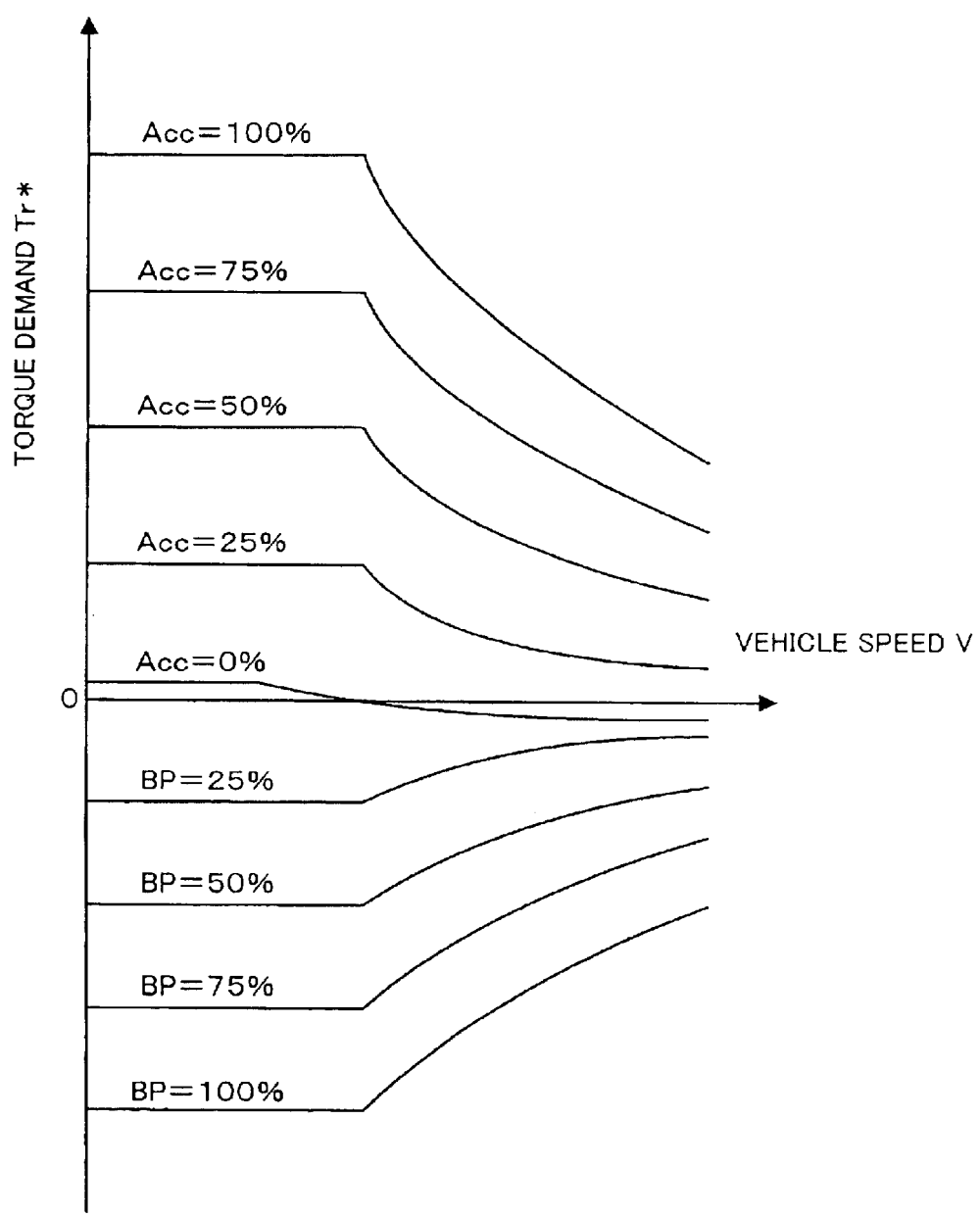
FIG. 3 shows a torque demand setting map.

After the input of the required data, the CPU 72 sets a required torque or torque demand Tr*, which is to be output to the ring gear shaft 32a functioning as the drive shaft linked with drive wheels 63a and 63b, and a required power or power demand P* for the vehicle, based on the input data of the accelerator opening Acc, the brake pedal position BP, and the vehicle speed V (step S110). In the structure of this embodiment, a mapping of the accelerator opening Acc, the brake pedal position BP, and the vehicle speed V to the torque demand Tr* is specified in advance and is stored in the form of a torque demand setting map into the ROM 74. The procedure of this embodiment reads and sets the value of the torque demand Tr* corresponding to the input data of the accelerator opening Acc, the brake pedal position BP, and the vehicle speed V from the map stored in the ROM 74. FIG. 3 shows one example of the torque demand setting map. The power demand P* is given as the sum of the product of the torque demand Tr* and a revolution speed Nr of the ring gear shaft 32a, a charge-discharge demand or required charge-discharge quantity Pb* of the battery 50, and a potential loss. Here the revolution speed Nr of the ring gear shaft 32a may be obtained by dividing the revolution speed Nm2 of the motor MG2 by a gear ratio Gr of the reduction gear 35 or by multiplying the vehicle speed V by a conversion coefficient k. The charge-discharge demand Pb* of the battery 50 may be set according to a state of charge (SOC) of the battery 50 and the accelerator opening Acc.

After setting the torque demand Tr* and the power demand P*, the CPU 72 checks the values of a revolution speed setting flag FS1 and a control start flag FS2 used for a start of the engine 22 (step S120). A value '1' is set to the revolution speed setting flag FS1, in response to setting of a revolution speed for starting the operation control of the engine 22 (control start revolution speed Nstart discussed later). A value '1' is set to the control start flag FS2, in response to a start of the operation control of the engine 22. These two flags FS1 and FS2 are set equal to an initial value '0', in response to the input of the start command of the engine 22.

Figure 4:
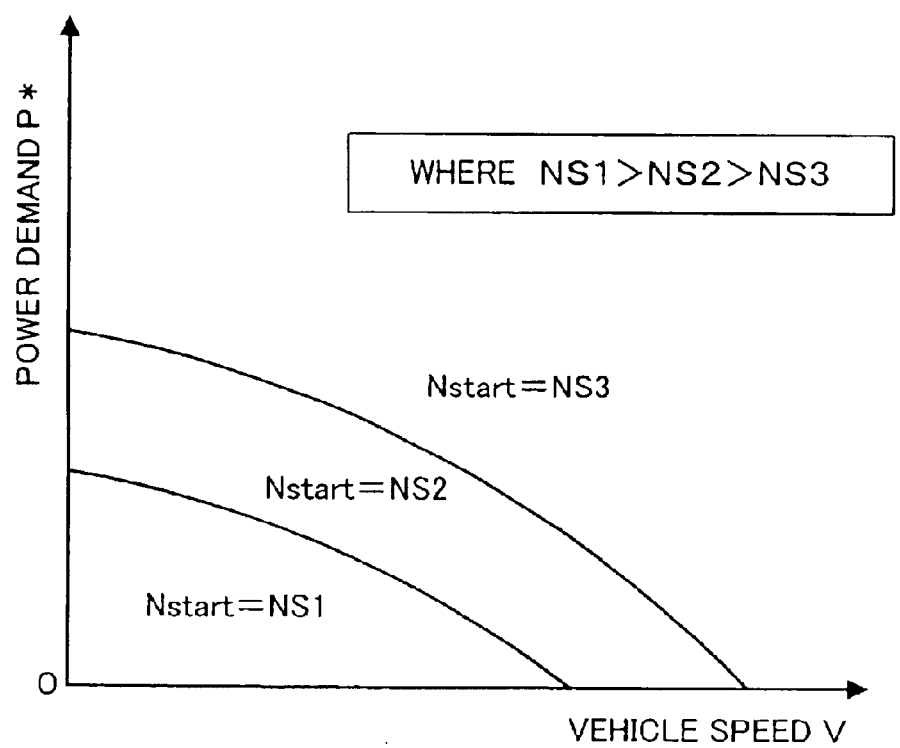
FIG. 4 shows a control start revolution speed setting map.

Immediately after the start command of the engine 22 was given, the value '0' is set to both of the revolution speed setting flag FS1 and the control start flag FS2. It is accordingly determined at step S120 that both the revolution speed setting flag FS1 and the control start flag FS2 are equal to '0'. The CPU 72 accordingly sets a control start revolution speed Nstart as the revolution speed for starting the operation control of the engine 22, based on the power demand P* and the vehicle speed V, and adds a fixed small revolution speed ΔN (for example, 50 rpm or 100 rpm) to the setting of the control start revolution speed Nstart to set a control revolution speed Nset (step S130). The CPU 72 then sets the value '1' to the revolution speed setting flag FS1 (step S140). In the structure of the embodiment, a mapping of the power demand P* and the vehicle speed V to the control start revolution speed Nstart is specified in advance and is stored in the form of a control start revolution speed setting map into the ROM 74. The procedure of the embodiment reads and sets the value of the control start revolution speed Nstart corresponding to the given power demand P* and vehicle speed V from the map stored in the ROM 74. FIG. 4 shows one example of the control start revolution speed setting map. In this embodiment, three revolution speed NS1; NS2, and NS3 satisfying a relation of NS1>NS2>NS3 are specified for three different areas defined by the power demand P* and the vehicle speed V as shown in FIG. 4. In the map adopted in this embodiment, the control start revolution speed Nstart is set to decrease with an increase in power demand P* and with an increase in vehicle speed V. Such settings are ascribed to the following reasons. Setting a relatively small value to the control start revolution speed Nstart is preferable to trigger an early start of operation control of the engine 22 and ensure quick output of power from the engine 22. In order to ensure reduction of vibrations of initial explosion and resulting reduction of potential vibrations arising at the time of starting the engine 22, on the other hand, setting a relatively large value to the control start revolution speed Nstart is preferable. The driver's sensitivity to the vibrations is lowered with an increase in vehicle speed V. At a high level of the power demand P*, a relatively small value is set to the control start revolution speed Nstart to attain quick output of power from the engine 22 against the vibration-reducing effects. The high power demand P* generally causes a high acceleration, which lowers the sensitivity of the driver against the vibrations at the time of starting the engine 22. The driver's sense of discomfort due to the vibrations is thus insignificant at this moment. The process of setting the control start revolution speed Nstart, the control revolution speed Nset, and the revolution speed setting flag FS1 (steps S130 and S140) is carried out only immediately after the input of the start command of the engine 22. In a subsequent cycle of this control routine, it is determined that step S120 that the revolution speed setting flag FS1 is set equal to the value '1'. The CPU 72 accordingly skips the processing of steps S130 and S140 and immediately proceeds to step S150. Even in the case of a subsequent variation in power demand P* or vehicle speed V, the settings of the control start revolution speed Nstart and the control revolution speed Nset are kept unchanged until completion of the start of the engine 22.

Figure 5:
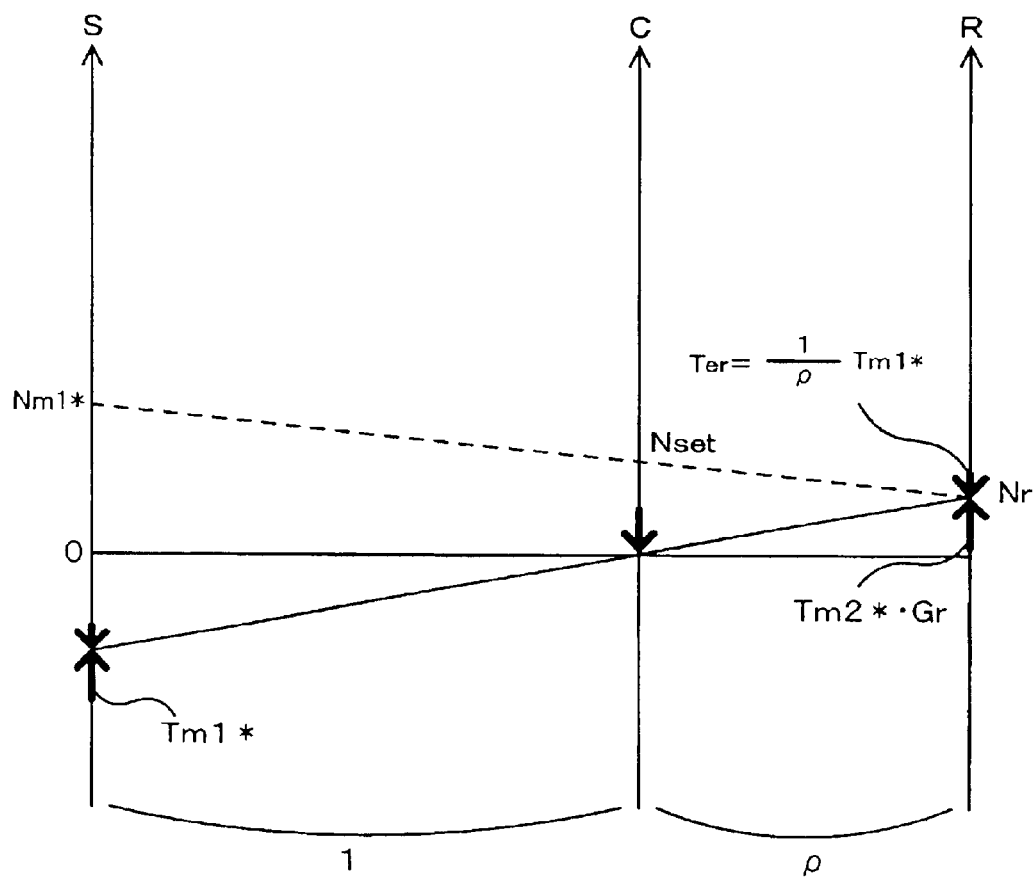
FIG. 5 is an alignment chart showing a dynamic relation between the revolution speed and the torque of rotational elements in a power distribution integration mechanism included in the hybrid vehicle of the embodiment, when motoring of an engine starts.

The CPU 72 calculates a target revolution speed Nm1* of the motor MG1 to motor the engine 22 at the setting of the control revolution speed Nset, according to Equation (1) given below, while calculating a torque command Tm1* to rotate the motor MG1 at the calculated target revolution speed Nm1*, according to Equation (2) given below (step S150). Equation (1) represents a dynamic relation of the rotational elements in the power distribution integration mechanism 30. Equation (2) represents a feedback control relation to rotate the motor MG1 at the target revolution speed Nm1*. In Equation (1), 'ρ' denotes a gear ratio (the number of teeth of the sun gear/the number of teeth of the ring gear) of the power distribution integration mechanism 30. In Equation (2), 'k1' in a second term of the right side denotes a gain of a proportional term and 'k2' in a third term of the right side denotes a gain of an integral term. The alignment chart of FIG. 5 shows a dynamic relation between the revolution speed and the torque of the rotational elements in the power distribution integration mechanism 30. In the alignment chart, a left S axis, a center C axis, and a right R axis respectively show the revolution speed of the sun gear 31, which is identical with the revolution speed Nm1 of the motor MG1, the revolution speed of the carrier 34, which is identical with the revolution speed Ne of the engine 22, and the revolution speed Nr of the ring gear 32, which is identical with the product of the revolution speed Nm2 of the motor MG2 and the gear ratio Gr of the reduction gear 35. The solid line represents an alignment when motoring of the engine 22 starts. The broken line represents an alignment when the engine 22 is rotated at the control revolution speed Nset. Equation (1) is readily led from this alignment chart. When motoring of the engine 22 starts or when the revolution speed Ne of the engine 22 in the course of motoring has not yet reached the control start revolution speed Nstart, the engine 22 is at a stop as shown by the solid-line alignment or is in a transient state from the solid-line alignment to the broken-line alignment. In this state, the torque command Tm1* of the motor MG1 is set to make the revolution speed Ne of the engine 22 equal to the control revolution speed Nset, against the friction torque of the engine 22. The calculation of the target revolution speed Nm1* of the motor MG1 does not use the control start revolution speed Nstart but uses the control revolution speed Nset, which is greater than the control start revolution speed Nstart by the fixed small revolution speed ΔN. This makes the revolution speed Ne of the engine 22 a little higher than the control start revolution-speed Nstart. Two thick arrows on the R axis respectively represent a torque acting on the ring gear shaft 32a when the engine 22 is motored by means of the motor MG1, and a torque acting on the ring gear shaft 32a as the torque Tm2* output from the motor MG2 goes through the reduction gear 35.

$$Nm1^* = Nset \cdot (1+\rho)/\rho - Nm2/(Gr \cdot \rho) \quad (1)$$

$$Tm1^* = \text{previous } Tm1^* + k1(Nm1^* - Nm1) + k2 \int (Nm1^* - Nm1)dt \quad (2)$$

After calculation of the target revolution speed Nm1* and the torque command Tm1* of the motor MG1, the CPU 72 divides a difference between an output limit Wout of the battery 50 and a power consumption (or power generation) of the motor MG1, which is defined as the product of the calculated torque command Tm1* of the motor MG1 and the current revolution speed Nm1 of the motor MG1, by the revolution speed Nm2 of the motor MG2, so as to calculate a torque limit Tmax as an upper limit of the torque output from the motor MG2 according to Equation (3) given below (step S160). The CPU 72 subsequently calculates a tentative motor torque Tm2tmp to be output from the motor MG2 from the setting of the torque demand Tr*, the calculated torque command Tm1*, and the gear ratio ρ of the power distribution integration mechanism 30 according to Equation (4) given below (step S170). The CPU 72 compares the calculated torque limit Tmax with the calculated tentative motor torque Tm2tmp and sets the smaller to a torque command Tm2* of the motor MG2 (step S180). Setting the torque command Tm2* of the motor MG2 in this manner enables the torque acting on the ring gear shaft 32a in the process of motoring the engine 22 by the motor MG1 to be cancelled by the torque output from the motor MG2, while setting the torque demand Tr* to be output to the ring gear shaft 32a as the torque restricted in the range of the output limit of the battery 50. Equation (4) is readily led from the alignment chart of FIG. 5 discussed above.

$$Tmax = (Wout - Tm1^* \cdot Nm1)/Nm2 \quad (3)$$

$$Tm2tmp = (Tr^* + Tm1^*/\rho)/Gr \quad (4)$$

After setting the torque command Tm1* of the motor MG1 and the torque command Tm2* of the motor MG2, the CPU 72 sends the settings of the torque command Tm1* and the torque command Tm2* to the motor ECU 40 (step S190), and compares the revolution speed Ne of the engine 22 with the control start revolution speed Nstart (step S200). When the revolution speed Ne of the engine 22 is less than the control start revolution speed Nstart, the program exits from this start-time control routine.

The series of processing of steps S100 to S200 is repeatedly executed, as the motor MG1 is driven and controlled to rotate the engine 22 at the control revolution speed Nset, which is higher than the control start revolution speed Nstart. When the revolution speed Ne of the engine 22 motored by the motor MG1 reaches or exceeds the control start revolution speed Nstart, an affirmative answer is given at step S200. The CPU 72 accordingly sends a start command of starting the operation control of the engine 22, which includes fuel injection control, ignition control, and throttle opening regulation of the engine 22, to the engine ECU 24 (step S220) and sets the value '1' to the control start flag FS2 (step S230). The engine ECU 24 receives the start command of operation control of the engine 22 and carries out operation control of the engine 22 to make the engine 22 driven at a drive point defined by a target revolution speed Ne* and a target torque Te* as discussed later.

After setting of the value '1' to the control start flag FS2, it is determined at step S120 that both the revolution speed setting flag FS1 and the control start flag FS2 are equal to '1'. The CPU 72 then sets a target power Pe* of the engine 22, based on the setting of the power demand P* and the previous target power Pe* of the engine 22 that was set in the previous cycle of this routine (step S240). The procedure of this embodiment performs a smoothing process to compute the target power Pe* from the previous target power Pe* and the setting of the power demand P* with a preset time constant. The initial value of the target power Pe* is set equal to '0'.

Figure 6:
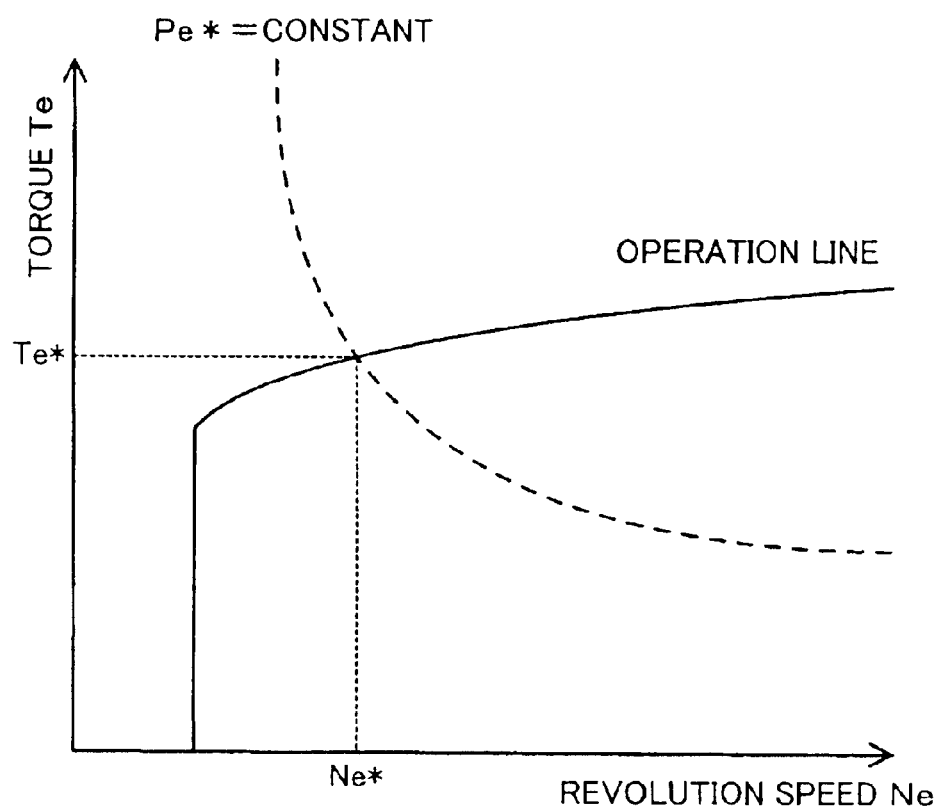
FIG. 6 shows an operation line of the engine and a process of setting a target revolution speed Ne* and a target torque Te*.

The CPU 72 sets a target revolution speed Ne* and a target torque Te* of the engine 22, based on the setting of the target power Pe* (step S250). When the torque demand Tr* is set to the target power Pe*, the procedure sets the target revolution speed Ne* and the target torque Te*, based on an operation line for efficient operations of the engine 22 and the setting of the target power Pe*. FIG. 6 shows one example of the operation line of the engine 22 and a process of setting the target revolution speed Ne* and the target torque Te*. As illustrated, the target revolution speed Ne* and the target torque Te* are specified as an intersection of the operation line with a curve of constant target power Pe* (=Ne*×Te*).

Figure 7:
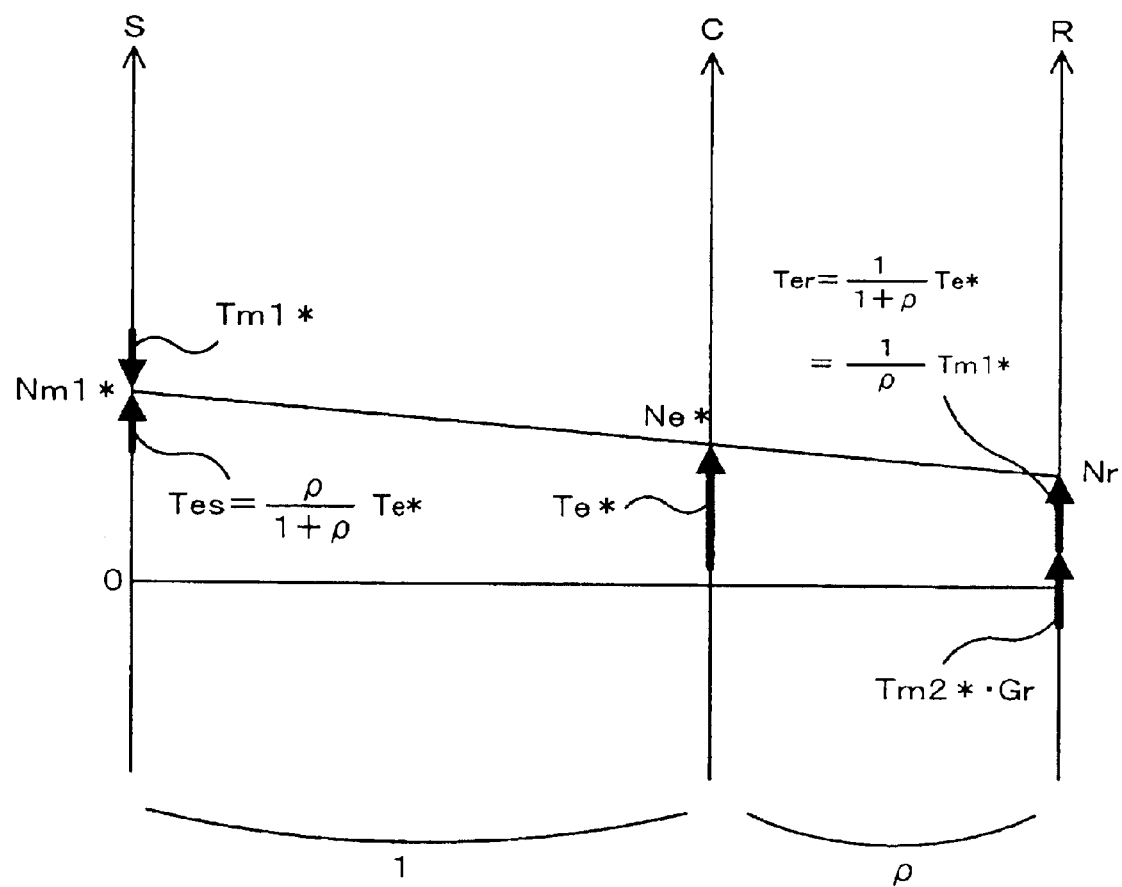
FIG. 7 is an alignment chart showing a dynamic relation between the revolution speed and the torque of the rotational elements in the power distribution integration mechanism after the start of the operation control of the engine.

The CPU 72 calculates the target revolution speed Nm1* of the motor MG1 from the setting of the target revolution speed Ne*, the revolution speed Nr (=Nm2/Gr) of the ring gear shaft 32a, and the gear ratio ρ of the power distribution integration mechanism 30 according to Equation (5) given below, while calculating the torque command Tm1* of the motor MG1 from the calculated target revolution speed Nm1* and the current revolution speed Nm1 of the motor MG1 according to Equation (2) given above (step S260). Equation (5) represents a dynamic relation of the rotational elements in the power distribution integration mechanism 30. The alignment chart of FIG. 7 shows the dynamic relation between the revolution speed and the torque of the rotational elements in the power distribution integration mechanism 30 after the start of the operation control of the engine 22. In the alignment chart of FIG. 7, the target torque Te* of the engine 22 is output as a torque Ter to the ring gear 32 and as a torque Tes to the sun gear 31. Equation (5) is readily led from this alignment chart.

$$Nm1^* = Ne^* \cdot (1+\rho)/\rho - Nm2/(Gr \cdot \rho) \tag{5}$$

After calculation of the target revolution speed Nm1* and the torque command Tm1* of the motor MG1, the processing of steps S270 to S290 is carried out to set the torque command Tm2* of the motor MG2. The processing of steps S270 to S290 is identical with the processing of steps S160 to S180 discussed above and is thus not specifically described here. The CPU 72 sends the settings of the target revolution speed Ne* and the target torque Te* of the engine 22 to the engine ECU 24, while sending the settings of the torque command Tm1* of the motor MG1 and the torque command Tm2* of the motor MG2 to the motor ECU 40 (step S300). The program then exits from this start-time control routine. The engine ECU 24 receives the target revolution speed Ne* and the target torque Te* and carries out operation control of the engine 22 including fuel injection control and ignition control to make the engine 22 driven at the drive point defined by the target revolution speed Ne* and the target torque Te*. The motor ECU 40 receives the torque command Tm1* and the torque command Tm2* and carries out switching control of the switching elements included in the inverters 41 and 42 to make the motor MG1 driven with the torque command Tm1* and the motor MG2 driven with the torque command Tm2*.

As described above, the start-time control of the engine 22 carried out in the hybrid vehicle 20 of the embodiment sets the control start revolution speed Nstart to decrease with an increase in power demand P* and motors the engine 22. When the revolution speed Ne of the engine 22 reaches the control start revolution speed Nstart, the operation control of the engine 22 starts. When the driver steps on the accelerator pedal 83 to require a high level of the power demand P*, the engine start-time control sets a small value to the control start revolution speed Nstart to trigger an early start of operation control of the engine 22 and thereby ensure resulting quick output of power from the engine 22. When the driver requires a low level of the power demand P*, on the other hand, the engine start-time control sets a large value to the control start revolution speed Nstart to trigger a rather late start of operation control of the engine 22 and thereby reduce the potential vibrations arising at the time of starting the engine 22. The start-time control of the engine 22 carried out in the hybrid vehicle 20 of the embodiment also sets the control start revolution speed Nstart to decrease with an increase in vehicle speed V and motors the engine 22. When the revolution speed Ne of the engine 22 reaches the control start revolution speed Nstart, the operation control of the engine 22 starts. This ensures an adequate start of the engine 22 following the driver's sensitivity to the potential vibrations arising at the time of starting the engine 22. The operation control of the engine 22 starts when the revolution speed Ne of the engine 22 reaches the control start revolution speed Nstart, which depends upon the power demand P* and the vehicle speed V. This arrangement ensures a quick response to the driver's power demand Tr* and effectively reduces the potential vibrations arising at the time of starting the engine 22.

The hybrid vehicle 20 of the embodiment adopts the smoothing process to set the target power Pe* of the engine 22. Any of other available techniques, for example, a rating process, may be applied to set the target power Pe* of the engine 22. A specified value other than '0' may be set to the initial value of the target power Pe*.

Figure 8:
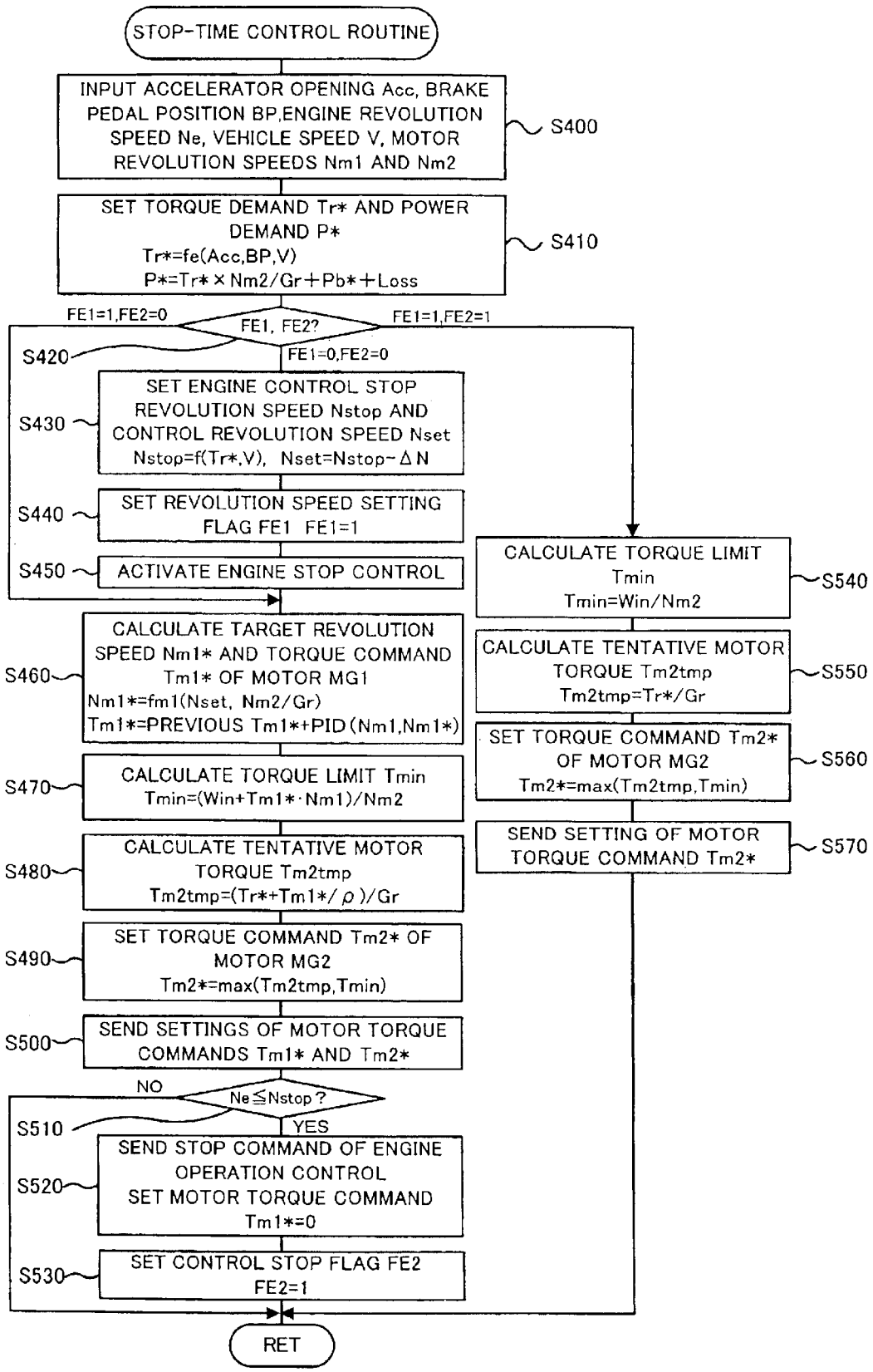
FIG. 8 is a flowchart showing a stop-time control routine executed by the hybrid electronic control unit in the hybrid vehicle of the embodiment.

The discussion now regards the engine stop-time operation to stop the engine 22 and shift the drive mode from the torque conversion drive mode or the charge-discharge drive mode to the motor drive mode, when the driver steps on the brake pedal 85 during a run in the torque conversion drive mode or the charge-discharge drive mode. FIG. 8 is a flowchart showing a stop-time control routine, which is executed by the hybrid electronic control unit 70, in response to the step-on action of the brake pedal 85 during a run in the torque conversion drive mode or in the charge-discharge drive mode to give a stop command of the engine 22. This routine is executed repeatedly at preset time intervals (for example, at every 8 msec) since input of the stop command of the engine 22.

When the program enters the stop-time control routine, the CPU 72 of the hybrid electronic control unit 70 first inputs required data for control, which include the accelerator opening Acc sent from the accelerator pedal position sensor 84, the brake pedal position BP sent from the brake pedal position sensor 86, the vehicle speed V sent from the vehicle speed sensor 88, the revolution speed Ne of the engine 22, and the revolution speeds Nm1 and Nm2 of the motors MG1 and MG2 (step S400). The CPU 72 subsequently sets the torque demand Tr*, which is to be output to the ring gear shaft 32a functioning as the drive shaft linked with the drive wheels 63a and 63b, and the power demand P* for the vehicle, based on the input data of the accelerator opening Acc, the brake pedal position BP, and the vehicle speed V (step S410). The processing of these steps S400 and S410 is identical with the processing of steps S100 and S110 in the start-time control routine of FIG. 2 discussed above.

The CPU 72 then checks the values of a revolution speed setting flag FE1 and a control stop flag FE2 used for a stop of the engine 22 (step S420). A value '1' is set to the revolution speed setting flag FE1, in response to setting of a revolution speed for stopping the control operation of the engine 22 (control stop revolution speed Nstop discussed later). A value '1' is set to the control stop flag FE2, in response to a stop of the operation control of the engine 22. These two flags FE1 and FE2 are set equal to an initial value '0', in response to the input of the stop command of the engine 22.

Figure 9:
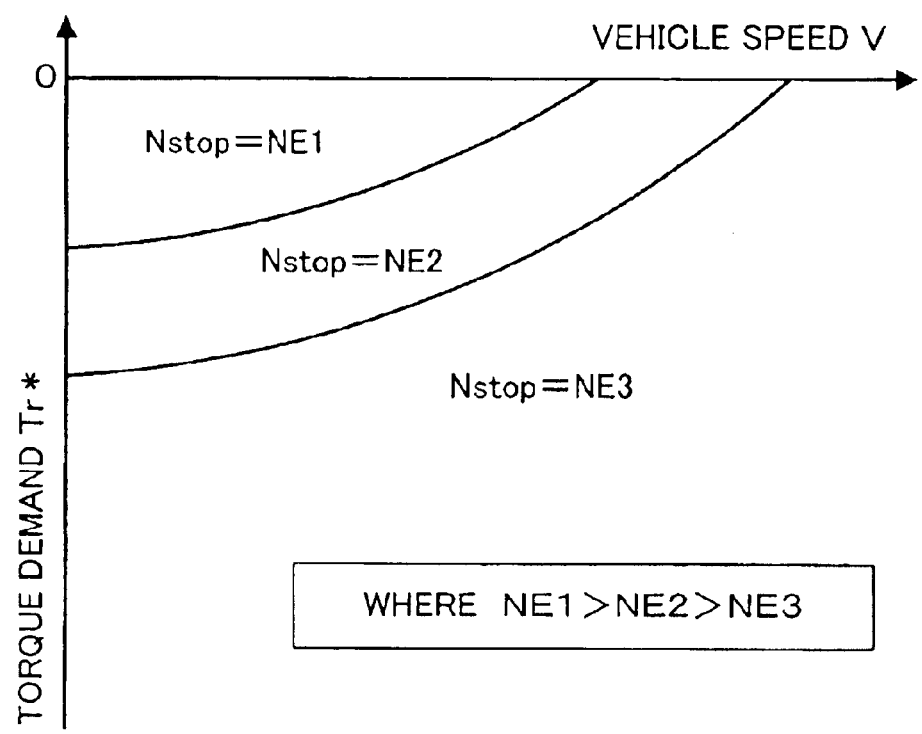
FIG. 9 shows a control stop revolution speed setting map.

Immediately after the stop command of the engine 22 was given, the value '0' is set to both of the revolution speed setting flag FE1 and the control stop flag FE2. It is accordingly determined at step S420 that both the revolution speed setting flag FE1 and the control stop flag FE2 are equal to '0'. The CPU 72 accordingly sets a control stop revolution speed Nstop as the revolution speed for stopping the operation control of the engine 22, based on the torque demand Tr* and the vehicle speed V, and subtracts a fixed small revolution speed $\Delta N$ (for example, 50 rpm or 100 rpm) from the setting of the control stop revolution speed Nstop to set a control revolution speed Nset (step S430). The CPU 72 then sets the value '1' to the revolution speed setting flag FE1 (step S440), and sends a start command of engine stop control to the engine ECU 24 (step S450). In the structure of the embodiment, a mapping of the torque demand Tr* and the vehicle speed V to the control stop revolution speed Nstop is specified in advance and is stored in the form of a control stop revolution speed setting map into the ROM 74. The procedure of the embodiment reads and sets the value of the control stop revolution speed Nstop corresponding to the given torque demand Tr* and vehicle speed V from the map stored in the ROM 74. FIG. 9 shows one example of the control stop revolution speed setting map. In this embodiment, three revolution speed NE1, NE2, and NE3 satisfying a relation of NE1>NE2>NE3 are specified for three different areas defined by the torque demand Tr* and the vehicle speed V as shown in FIG. 9. In the map adopted in this embodiment, the control stop revolution speed Nstop is set to increase with a decrease in absolute value of the torque demand Tr* and to decrease with an increase in vehicle speed V. The torque demand Tr* represents the driver's requirement of torque to be output to the ring gear shaft 32a functioning as the drive shaft. At the moment when the driver steps on the brake pedal 85, the torque demand Tr* is regarded as the driver's requirement of deceleration. Namely in the map adopted in the embodiment, the control stop revolution speed Nstop is set to increase with a decrease in absolute value of the deceleration. When the deceleration has a large absolute value, the procedure of the embodiment sets a relatively small value to the control stop revolution speed Nstop to quickly reduce the revolution speed Ne of the engine 22 and thereby ensure a quick stop of the engine 22. Under such conditions, the driver requires a large braking force and has the lowered sensitivity to the potential vibrations arising at the time of stopping the engine 22. The driver's sense of discomfort due to the vibrations is thus insignificant at this moment. The control stop revolution speed Nstop is set to decrease with an increase in vehicle speed V, since the higher vehicle speed V lowers the driver's sensitivity against the vibrations. The effects of the vibrations are negligible under such conditions, even when a relatively small value is set to the control stop revolution speed Nstop to quickly reduce the revolution speed Ne of the engine 22 and stop the operation control of the engine 22. The engine stop-time control of this embodiment drives the engine 22 in a non-torque output state. The process of setting the control stop revolution speed Nstop, the control revolution speed Nset, and the revolution speed setting flag FE1 and the process of activating the engine stop control (steps S430 to S450) are carried out only immediately after the input of the stop command of the engine 22. In a subsequent cycle of this control routine, it is determined that step S420 that the revolution speed setting flag FE1 is set equal to the value '1'. The CPU 72 accordingly skips the processing of steps S430 to S450 and immediately proceeds to step S460. Even in the case of a subsequent variation in torque demand Tr* or vehicle speed V, the settings of the control stop revolution speed Nstop and the control revolution speed Nset are kept unchanged until completion of the stop of the engine 22.

The CPU 72 calculates the target revolution speed Nm1* of the motor MG1 to motor the engine 22 at the setting of the control revolution speed Nset, according to Equation (1) given above, while calculating the torque command Tm1* to rotate the motor MG1 at the calculated target revolution speed Nm1*, according to Equation (2) given above (step S460). The CPU 72 then divides a sum of an input limit Win of the battery 50 and a power consumption (or power generation) of the motor MG1, which is defined as the product of the calculated torque command Tm1* of the motor MG1 and the current revolution speed Nm1 of the motor MG1, by the revolution speed Nm2 of the motor MG2, so as to calculate a torque limit Tmin as a lower limit of the torque output from the motor MG2 according to Equation (6) given below (step S470). The CPU 72 subsequently calculates the tentative motor torque Tm2tmp to be output from the motor MG2 from the setting of the torque demand Tr*, the calculated torque command Tm1*, and the gear ratio ρ of the power distribution integration mechanism 30 according to Equation (4) given above (step S480). The CPU 72 compares the calculated torque limit Tmin with the calculated tentative motor torque Tm2tmp and sets the greater to the torque command Tm2* of the motor MG2 (step S490). Setting the torque command Tm2* of the motor MG2 in this manner enables the torque acting on the ring gear shaft 32a in the process of regulating the revolution speed of the engine 22 by the motor MG1 to be cancelled by the torque output from the motor MG2, while setting the torque demand Tr* to be output to the ring gear shaft 32a as the torque restricted in the range of the input limit of the battery 50.

$$T\min = (W\text{in} + Tm1^* \cdot Nm1)/Nm2 \quad (6)$$

The CPU 72 sends the settings of the torque command Tm1* of the motor MG1 and the torque command Tm2* of the motor MG2 to the motor ECU 40 (step S500), and compares the revolution speed Ne of the engine 22 with the control stop revolution speed Nstop (step S510). When the revolution speed Ne of the engine 22 is greater than the control stop revolution speed Nstop, the program exits from this stop-time control routine.

The series of processing of steps S400 to S510 is repeatedly executed, as the motor MG1 is driven and controlled to rotate the engine 22 at the control revolution speed Nset, which is lower than the control stop revolution speed Nstop. When the revolution speed Ne of the engine 22 reaches or becomes less than the control stop revolution speed Nstop, an affirmative answer is given at step S510. The CPU 72 accordingly sends a stop command to stop the operation control of the engine 22, which includes fuel injection control, ignition control, and throttle opening regulation of the engine 22, to the engine ECU 24 and sets the value '0' to the torque command Tm1* of the motor MG1 (step S520), while setting the value '1' to the control stop flag FE2 (step S530). The engine ECU 24 receives the stop command of the operation control of the engine 22 and stops the fuel injection control, the ignition control, the throttle opening regulation, and other angular regulation. The motor ECU 40 controls the motor MG1, such that no torque is subsequently output from the motor MG1.

After setting of the value '1' to the control stop flag FE2, it is determined at step S420 that both the revolution speed setting flag FE1 and the control stop flag FE2 are equal to '1'. The CPU 72 then divides the input limit Win of the battery 50 by the revolution speed Nm2 of the motor MG2 to calculate the torque limit Tmin according to Equation (7) given below, while dividing the torque demand Tr* by the gear ratio Gr of the reduction gear 35 to calculate the tentative motor torque Tm2tmp according to Equation (8) given below (step S550). The CPU 72 compares the calculated torque limit Tmin with the calculated tentative motor torque Tm2tmp and sets the greater to the torque command Tm2* of the motor MG2 (step S560). The CPU 72 then sends the setting of the torque command Tm2* of the motor MG2 to the motor ECU 40 (step S570). The motor ECU 40 receiving the torque command Tm2* carries out the control as discussed previously.

$$T\min = W\text{in}/Nm2 \quad (7)$$

$$Tm2tmp = Tr^*/Gr \quad (8)$$

As described above, the stop-time control of the engine 22 carried out in the hybrid vehicle 20 of the embodiment sets the control stop revolution speed Nstop to increase with a decrease in absolute value of the torque demand Tr*, that is, with a decrease in absolute value of the deceleration, and lowers the revolution speed Ne of the engine 22. When the revolution speed Ne of the engine 22 reaches the control stop revolution speed Nstop, the operation control of the engine 22 stops. When the driver steps on the brake pedal 85 to require the torque demand Tr* of a large absolute value as the braking force and to demand the deceleration of a large absolute value, the engine stop-time control sets a relatively small value to the control stop revolution speed Nstop. Such setting of the control stop revolution speed Nstop quickly reduces the revolution speed Ne of the engine 22 and stops the operation control of the engine 22. When the driver requires the torque demand Tr* of a small absolute value, on the other hand, the engine stop-time control sets a relatively large value to the control stop revolution speed Nstop and stops the operation control of the engine 22. This effectively reduces the potential vibrations arising at the time of stopping the operations of the engine 22. The stop-time control of the engine 22 carried out in the hybrid vehicle 20 of the embodiment also sets the control stop revolution speed Nstop to decrease with an increase in vehicle speed V and lowers the revolution speed Ne of the engine 22. When the revolution speed Ne of the engine 22 reaches the control stop revolution speed Nstop, the operation control of the engine 22 stops. This ensures an adequate stop of the engine 22 following the driver's sensitivity to the potential vibrations arising at the time of stopping the operations of the engine 22. The operation control of the engine 22 stops when the revolution speed Ne of the engine 22 reaches the control stop revolution speed Nstop, which depends upon the torque demand Tr* (that is, deceleration) and the vehicle speed V. This arrangement ensures a quick response to the driver's torque demand Tr* and effectively reduces the potential vibrations arising at the time of stopping the operations of the engine 22.

The hybrid vehicle 20 of the embodiment continues the operation control of the engine 22 to output a null torque, until the revolution speed Ne of the engine 22 reaches the control stop revolution speed Nstop. The torque output from the engine 22 is, however, not restrictive and may be any value.

Figure 10:
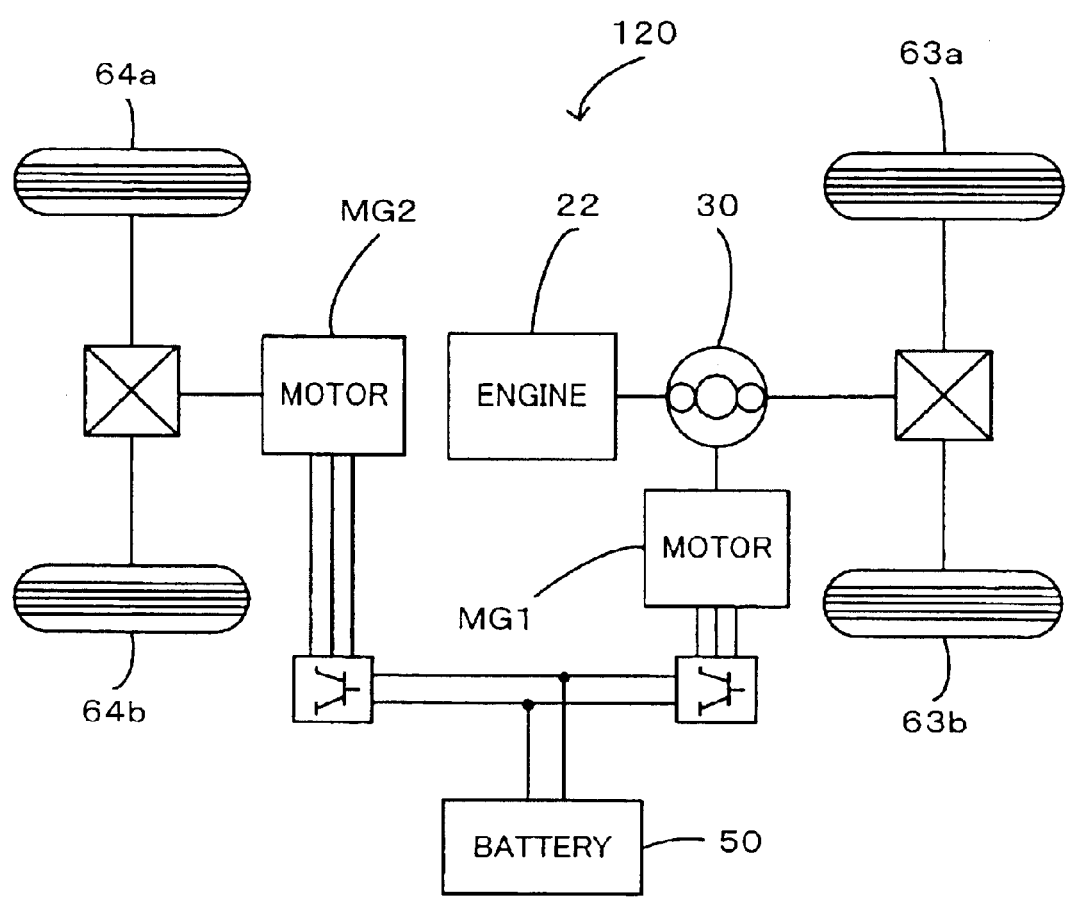
FIG. 10 schematically illustrates the construction of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 10, the power of the motor MG2 may be output to another axle (that is, an axle linked with wheels 64a and 64b), which is different from an axle connected with the ring gear shaft 32a (that is, an axle linked with the wheels 63a and 63b).

Figure 11:
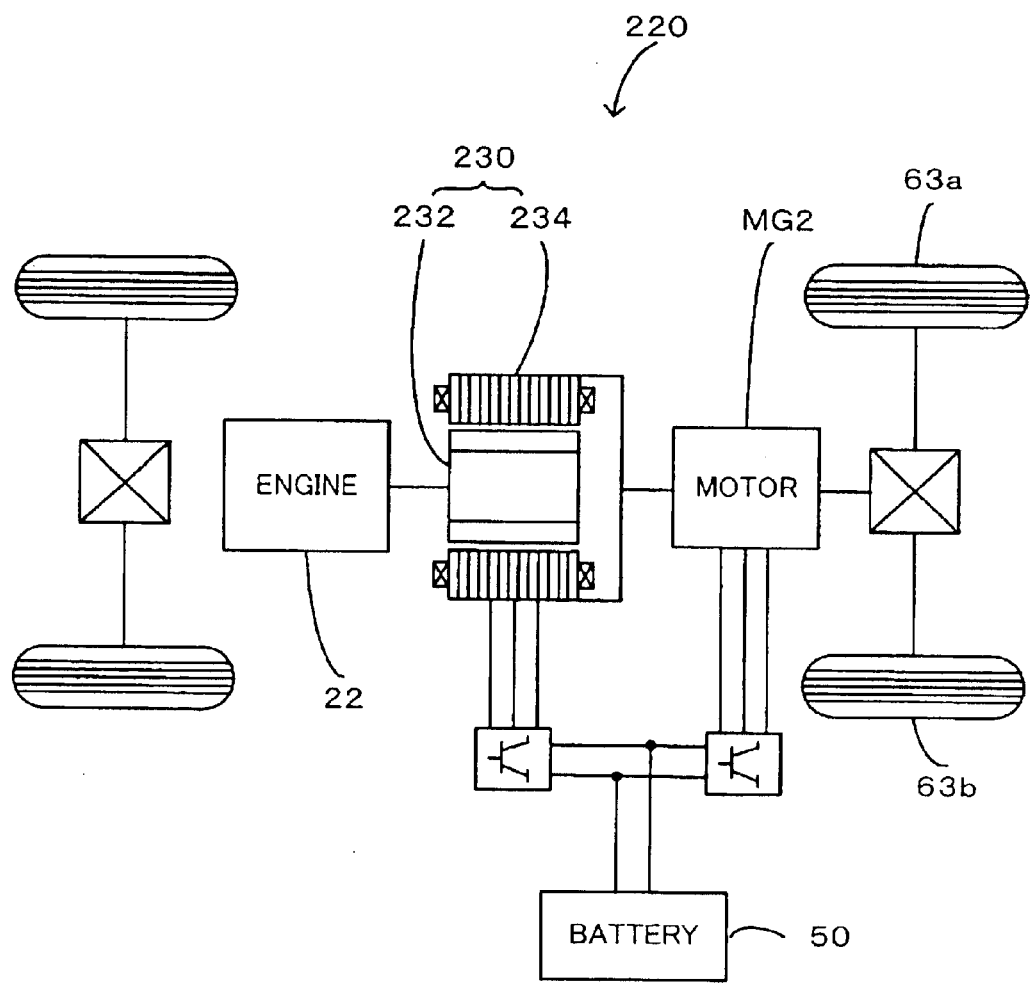
FIG. 11 schematically illustrates the construction of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

What is claimed is:

1. A hybrid vehicle that is drivable with power from an internal combustion engine and with power from a motor, said hybrid vehicle comprising:

a motoring module that motors said internal combustion engine;

a driving condition detection module that detects a driving condition of said hybrid vehicle;

a power demand specification module that specifies a driver's power demand; and a start-time control module that, in response to input of a start command of said internal combustion engine during a run in a drive mode where operation of said internal combustion engine is at a stop and said hybrid vehicle is driven with only the power from said motor, drives and controls said motoring module to rotate said internal combustion engine at a control start revolution speed, which has been set based on the driving condition of said hybrid vehicle detected by said driving condition detection module and the power demand specified by said power demand specification module, while starting operation control of said internal combustion engine, which includes fuel injection control and ignition control in said internal combustion engine, when a revolution speed of said internal combustion engine reaches the setting of the control start revolution speed.

2. A hybrid vehicle in accordance with claim 1, wherein said start-time control module sets the control start revolution speed to decrease with an increase in power demand specified by said power demand specification module.

3. A hybrid vehicle in accordance with claim 1, said hybrid vehicle further comprising:

an electric power-dynamic power input-output module that is connected with an output shaft of said internal combustion engine and with a drive shaft linked with an axle, and outputs at least part of the power from said internal combustion engine to said drive shaft accompanied with input and output of electric power and dynamic power, wherein said motoring module motors said internal combustion engine by utilizing actuation of said electric power-dynamic power input-output module.

4. A hybrid vehicle in accordance with claim 3, wherein said electric power-dynamic power input-output module comprises:

a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and a generator that inputs and outputs power from and to said third shaft.

5. A hybrid vehicle in accordance with claim 3, wherein said electric power-dynamic power input-output module is a pair-rotor motor, which comprises a first rotor linked with said output shaft of said internal combustion engine and a second rotor linked with said drive shaft and outputs at least part of the power from said internal combustion engine to said drive shaft accompanied with input and output of electric power generated through an electromagnetic interaction between said first rotor and said second rotor.

6. A hybrid vehicle in accordance with claim 1, wherein said driving condition detection module detects a vehicle speed as one driving condition of said hybrid vehicle.

7. A hybrid vehicle in accordance with claim 6, wherein said start-time control module sets the control start revolution speed to decrease with an increase in vehicle speed detected by said driving condition detection module.

8. A hybrid vehicle in accordance with claim 7, wherein said start-time control module sets the control start revolution speed to decrease with an increase in power demand specified by said power demand specification module.

9. A hybrid vehicle in accordance with claim 7, said hybrid vehicle further comprising:

an electric power-dynamic power input-output module that is connected with an output shaft of said internal combustion engine and with a drive shaft linked with an axle, and outputs at least part of the power from said internal combustion engine to said drive shaft accompanied with input and output of electric power and dynamic power, wherein said motoring module motors said internal combustion engine by utilizing actuation of said electric power-dynamic power input-output module.

10. A hybrid vehicle in accordance with claim 9, wherein said electric power-dynamic power input-output module comprises:

a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and a generator that inputs and outputs power from and to said third shaft.

11. A hybrid vehicle in accordance with claim 9, wherein said electric power-dynamic power input-output module is a pair-rotor motor, which comprises a first rotor linked with said output shaft of said internal combustion engine and a second rotor linked with said drive shaft and outputs at least part of the power from said internal combustion engine to said drive shaft accompanied with input and output of electric power generated through an electromagnetic interaction between said first rotor and said second rotor.

12. An internal combustion engine starting method that starts an internal combustion engine during a run of a hybrid vehicle in a specific drive mode where operation of said internal combustion engine is at a stop and said hybrid vehicle is driven with only power from a motor, said hybrid vehicle being drivable either in a drive mode with power from said internal combustion engine or in the specific drive mode with only the power from said motor and comprising a motoring module that motors said internal combustion engine, said internal combustion engine starting method comprising the steps of:

(a) detecting a driving condition of said hybrid vehicle;

(b) specifying a driver's power demand;

(c) setting a control start revolution speed, based on the driving condition of said hybrid vehicle detected in said step (a) and the power demand specified in said step (b);

(d) driving and controlling said motoring module to rotate said internal combustion engine at the setting of the control start revolution speed; and (e) starting operation control of said internal combustion engine, which includes fuel injection control and ignition control in said internal combustion engine, when a revolution speed of said internal combustion engine reaches the setting of the control start revolution speed.

13. An internal combustion engine starting method in accordance with claim 12, wherein said step (a) detects a vehicle speed of said hybrid vehicle, and said step (c) sets the control start revolution speed to decrease with an increase in vehicle speed detected in said step (a) and with an increase in power demand specified in said step (b).

14. An internal combustion engine starting method that starts an internal combustion engine during a run of a hybrid vehicle in a specific drive mode where operation of said internal combustion engine is at a stop and said hybrid vehicle is driven with only power from a motor, said hybrid vehicle comprising said internal combustion engine, an electric power-dynamic power input-output module that is connected with an output shaft of said internal combustion engine and with a drive shaft linked with an axle and outputs at least part of power from said internal combustion engine to said drive shaft accompanied with input and output of electric power and dynamic power, a motoring module that motors said internal combustion engine by utilizing actuation of said electric power-dynamic power input-output module, and said motor that outputs the power to said axle, said internal combustion engine starting method comprising the steps of:

(a) detecting a driving condition of said hybrid vehicle;

(b) specifying a driver's power demand;

(c) setting a control start revolution speed, based on the driving condition of said hybrid vehicle detected in said step (a) and the power demand specified in said step (b);

(d) driving and controlling said motoring module to rotate said internal combustion engine at the setting of the control start revolution speed; and (e) starting operation control of said internal combustion engine, which includes fuel injection control and ignition control in said internal combustion engine, when a revolution speed of said internal combustion engine reaches the setting of the control start revolution speed.

15. An internal combustion engine starting method in accordance with claim 14, wherein said step (a) detects a vehicle speed of said hybrid vehicle, and said step (c) sets the control start revolution speed to decrease with an increase in vehicle speed detected in said step (a) and with an increase in power demand specified in said step (b).

16. An internal combustion engine starting method in accordance with claim 15, wherein said electric power-dynamic power input-output module comprises:

a three-shaft power input-output assembly that is connected with three shafts, that is, said output shaft of said internal combustion engine, said drive shaft, and a third shaft, and specifies input and output of power from and to one residual shaft among said three shafts, based on powers input and output from and to two shafts among said three shafts; and a generator that inputs and outputs power from and to said third shaft.

17. An internal combustion engine starting method in accordance with claim 15, wherein said electric power-dynamic power input-output module is a pair-rotor motor, which comprises a first rotor linked with said output shaft of said internal combustion engine and a second rotor linked with said drive shaft and outputs at least part of the power from said internal combustion engine to said drive shaft accompanied with input and output of electric power generated through an electromagnetic interaction between said first rotor and said second rotor.

* * * * *